(12) United States Patent
Kakuda

(10) Patent No.: US 7,069,964 B1
(45) Date of Patent: Jul. 4, 2006

(54) FILLER

(75) Inventor: Masanori Kakuda, Kanazawa (JP)

(73) Assignee: Shibuya Kogyo Co., Ltd., Kanazawa (JP)

( * ) Notice: Subject to any disclaimer, the term of this patent is extended or adjusted under 35 U.S.C. 154(b) by 0 days.

(21) Appl. No.: 11/071,614

(22) Filed: Mar. 3, 2005

(51) Int. Cl.
*B65B 1/04* (2006.01)

(52) U.S. Cl. .................. 141/83; 141/165; 141/172

(58) Field of Classification Search ............. 141/83, 141/129, 144, 130, 148–150, 165, 167, 172, 141/176
See application file for complete search history.

(56) References Cited

U.S. PATENT DOCUMENTS

| 4,913,198 | A | * | 4/1990 | Hayahara et al. ............. 141/83 |
| 5,806,287 | A |   | 9/1998 | Trechsel |
| 5,819,816 | A | * | 10/1998 | Mayer ........................ 141/83 |
| 6,644,363 | B1 | * | 11/2003 | Sogliani et al. ............... 141/83 |
| 6,655,421 | B1 | * | 12/2003 | Kohashi et al. ............... 141/83 |

FOREIGN PATENT DOCUMENTS

| DE | 3432305 A1 | 3/1986 |
| EP | 0311229 A2 | 4/1989 |
| JP | 2002-362502 | 12/2002 |
| WO | WO 01/88698 A2 | 11/2001 |

OTHER PUBLICATIONS

European Patent Office Search Report dated Aug. 26, 2005 (7 pages).

* cited by examiner

*Primary Examiner*—Steven O. Douglas
(74) *Attorney, Agent, or Firm*—Flynn, Thiel, Boutell & Tanis, P.C.

(57) ABSTRACT

Vessels 2 on a conveying rail 4 are supported by a back guide 8 and are intermittently conveyed by a transfer rake 6. A number of filling nozzles 28 which corresponds to a number of vessels 2 are installed at a filling station F, and the conveying rail has a portion 4A which is elevatable. Metering receptacles 12 connected to load cells 16 are disposed in a manner corresponding to respective filling nozzles 28. These metering receptacles 12 do not contact vessels 2 when the conveying rail portion 4A is raised, but support the vessels when the conveying rail portion 4A is lowered, allowing a mensuration of the weight of vessels 2 by the load cells 16. During a normal filling operation, the conveying rail portion 4A is maintained in its raised position to convey the vessels 2 and performs a filling operation. During a sampling operation, the conveying rail portion 4A is lowered to place vessels 2 on the metering receptacles 12 to perform a mensuration while performing a filling operation. A sampling operation can be performed in a reduced length of time using a simple construction.

5 Claims, 5 Drawing Sheets

FILLER

BACKGROUND OF THE INVENTION AND RELATED ART STATEMENT

The present invention relates to a filler, in particular, to a filler provided with a sampling mechanism.

A filler is usually designed to open a liquid valve in a filled liquid passage formed within a filling valve to allow a liquid fed from a filled liquid tank to be filled into a vessel and to terminate a filling operation by closing the liquid valve upon detecting by metering means that a given quantity of filled liquid has been filled. In such a filler, a weight which is filled into the vessel is determined by a sampling test in order to confirm the accuracy of a filling operation for each filling valve. A filler which is provided with such a sampling mechanism is already known in the art (see, for example, Japanese Laid-Open Patent Publication No. 2002-362502).

A sampler disclosed in this citation is installed in a filler in which conveying means convey vessels one after another to a filling position where a filling mechanism comprising a plurality of filling nozzles fills the vessels, and includes a tare measuring means and an actual vessel measuring means disposed upstream and downstream of the filling mechanism for measuring the weight of the vessel before and after it is filled. The tare measuring means and the actual vessel measuring means are each constructed such that a vessel is extracted by a gripper as it is being conveyed by the conveying means, handed over to a weight meter which measure the weight thereof, and then returned to the conveying means.

In the arrangement of the sampler disclosed in the citation, there is a need for an apparatus which extracts a vessel from the production line on which vessels are conveyed and filled and returns it to the line after measuring the weight, with consequent problems that the apparatus becomes complex and bulky, requiring a large space for its provision and resulting in an increased cost. Another problem arises also that the sampling operation must extract and return a vessel from and to the line and thus takes a time. In particular, in an arrangement where a plurality of vessel are conveyed intermittently and are filled concurrently, the sampling operation must be repeated a number of times equal to the number of the nozzles, resulting in a prolonged length of time required for the sampling operations.

OBJECT AND SUMMARY OF THE INVENTION

Accordingly, it is an object of the present invention to provide a filler which is simple in construction and enables a sampling operation to be completed in a reduced length of time while avoiding the need to extract a vessel from the line on which vessels are conveyed and filled.

Above object is accomplished by providing a filler comprising conveying means for intermittently conveying a vessel placed on a conveying rail by engaging therewith, filling means disposed along a path for conveyance of vessels for filling a liquid into the vessel, mensuration means for measuring the quantity filled by the filling means, and control means for controlling an opening/closing of a liquid valve in the filling means so that a given quantity of liquid can be filled into the vessel while measuring by the mensuration means. In accordance with the present invention, the filler also comprises elevating means for elevating the conveying rail, moving means for moving the conveying means to a position where it is engaged with a vessel and to a position where it is not engaged with a vessel, a metering receptacle disposed in a manner corresponding to the position of the filling means for placing a vessel thereon when the conveying rail is lowered and being positioned to an elevation where it cannot contact a vessel when the conveying rail is raised, and weight detecting means connected to the metering receptacle, an arrangement being such that during a normal filling operation, the conveying rail is raised to perform a filling operation while a vessel is supported thereon while during a sampling operation, the conveying rail is lowered to place a vessel on the metering receptacle, whereupon the weight detecting means detects the weight of a liquid which is filled into the vessel by mensuration means.

With the described arrangement according to the present invention, there is no need to measure a vessel by extracting it from the line on which vessels are conveyed on a filler, and there is no need to return the vessel to the line also, thus dispensing with an apparatus such as a gripper which performs these operations and simplifying the construction to allow a reduction in the cost required. In addition, there is no need to repeat a sampling operation a number of times equal to the number of nozzles, and vessels which are concurrently filled by a plurality of nozzles can be sampled in one operation, allowing a substantial reduction in the sampling time.

DETAILED DESCRIPTION OF PREFERRED EMBODIMENT

Figure 2:
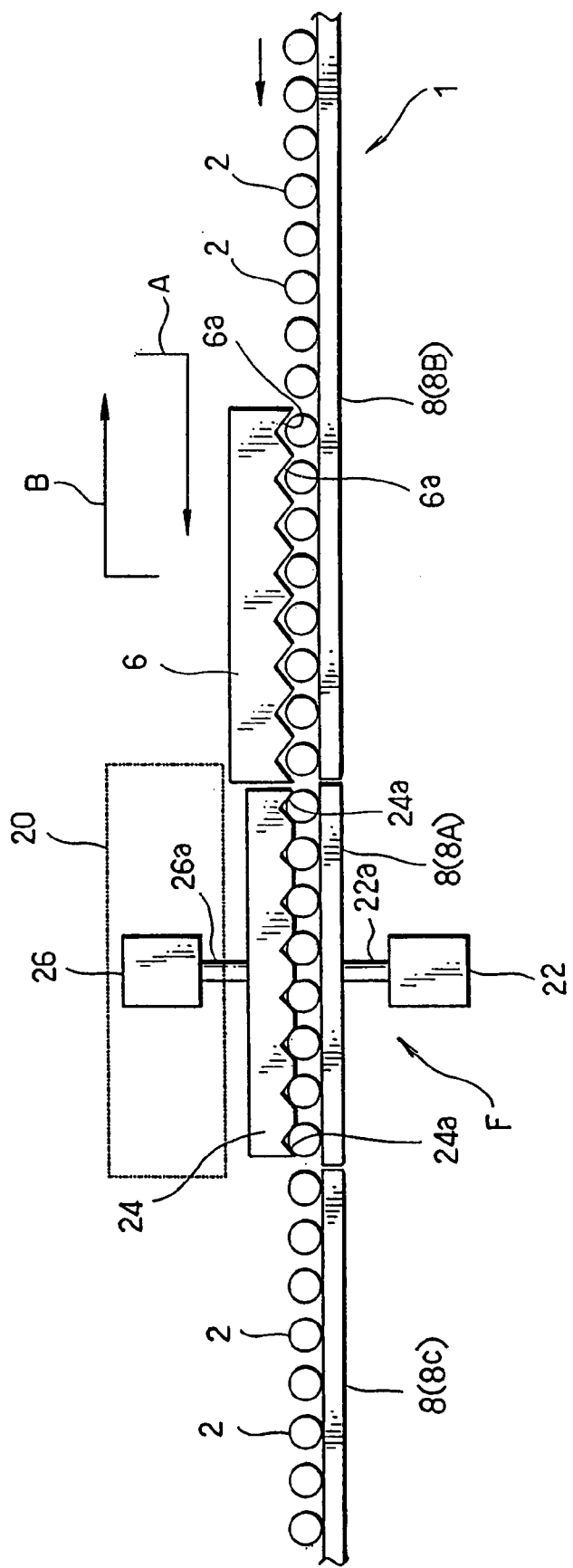
FIG. 2 is a plan view of an essential portion (conveying means and filling station) of the filler.

A vessel conveying line (generally indicated by numeral 1) which conveys a number of vessels 2 in one row comprises a conveying rail 4 (omitted from illustration in FIG. 2) which supports bottom surfaces of the vessels 2, a transfer rake 6 which engages vessels 2 placed on the conveying rail 4 for advancing them intermittently, and a back guide 8 which supports barrels of the vessels 2 from the back side as the vessels 2 are advanced by the transfer rake 6. The transfer rake 6 can reciprocate along the traveling direction of the vessels 2 (or movement in directions to the left and to the right as viewed in FIG. 2) and is also moveable back and forth toward the vessels 2 on the vessel conveying line 1 (or vessels 2 on the conveying rail 4) (movement in the vertical direction as viewed in FIG. 2). It moves toward the conveying rail 4 from a position where it is retracted from the conveying line 1 to engage the vessels 2, and move downstream to convey the vessels 2 (see arrow A shown in FIG. 2), and then retracts in a direction away from the conveying line 1 followed by returning to its upstream position again (see arrow B in FIG. 2). By repeating such operation, it conveys the vessels 2 intermittently. In this embodiment, the transfer rake 6 engages eight vessels 2 in one operation to cause them to slide on the conveying rail 4 for a distance which corresponds to eight vessels 2. The front surface of the transfer rake 6 is formed with a number of V-shaped recesses 6a which is equal to the number of the vessels 2 (which is eight in this embodiment) to allow its engagement with the individual vessels 2 in a reliable manner. While not shown, it is to be noted that a number of transfer rakes which are constructed in the similar manner as the one shown in FIG. 2 are disposed consecutively and operate in an integral manner to advance all the vessels in one row through the distance mentioned above.

A filling station F is provided intermediate the length of the vessel conveying line 1. A portion of the conveying rail 4 which is disposed in the filling station F is denoted by 4A, and is separated from an upstream and a downstream portion of the conveying rail 4, allowing only the portion 4A of the conveying rail 4 to be elevated. The upstream end and the downstream end of the elevatable conveying rail portion 4A are connected to piston rods 10a of elevating cylinders 10 which are disposed in vertical position, and the rail portion 4A assumes a raised position during a normal filling operation to support the vessels 2, but is lowered by actuating air cylinders 10 during a sampling operation which will be described later.

Figure 3:
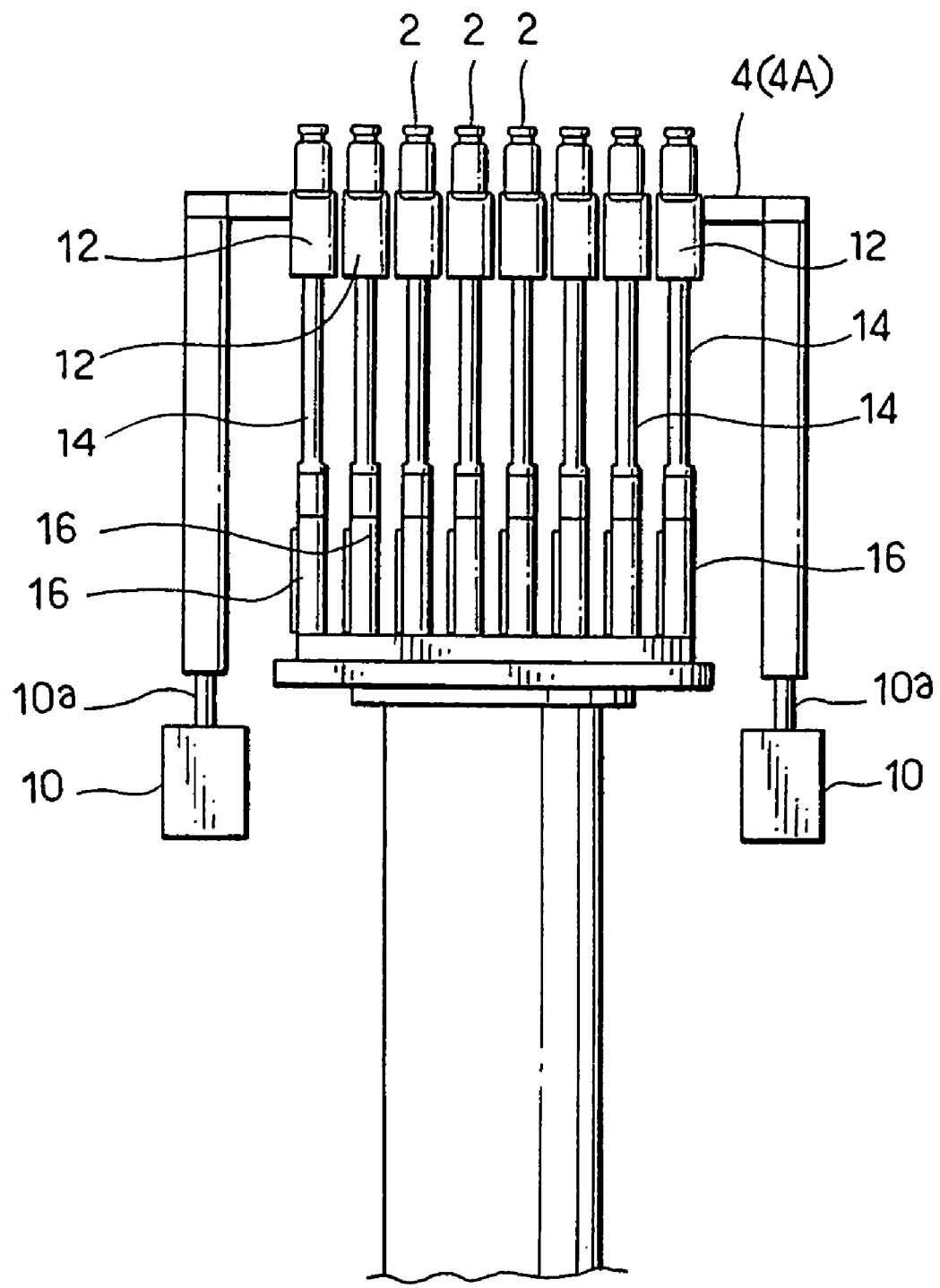
FIG. 3 is a front view of an essential portion (filling station) of the filler.
Figure 4:
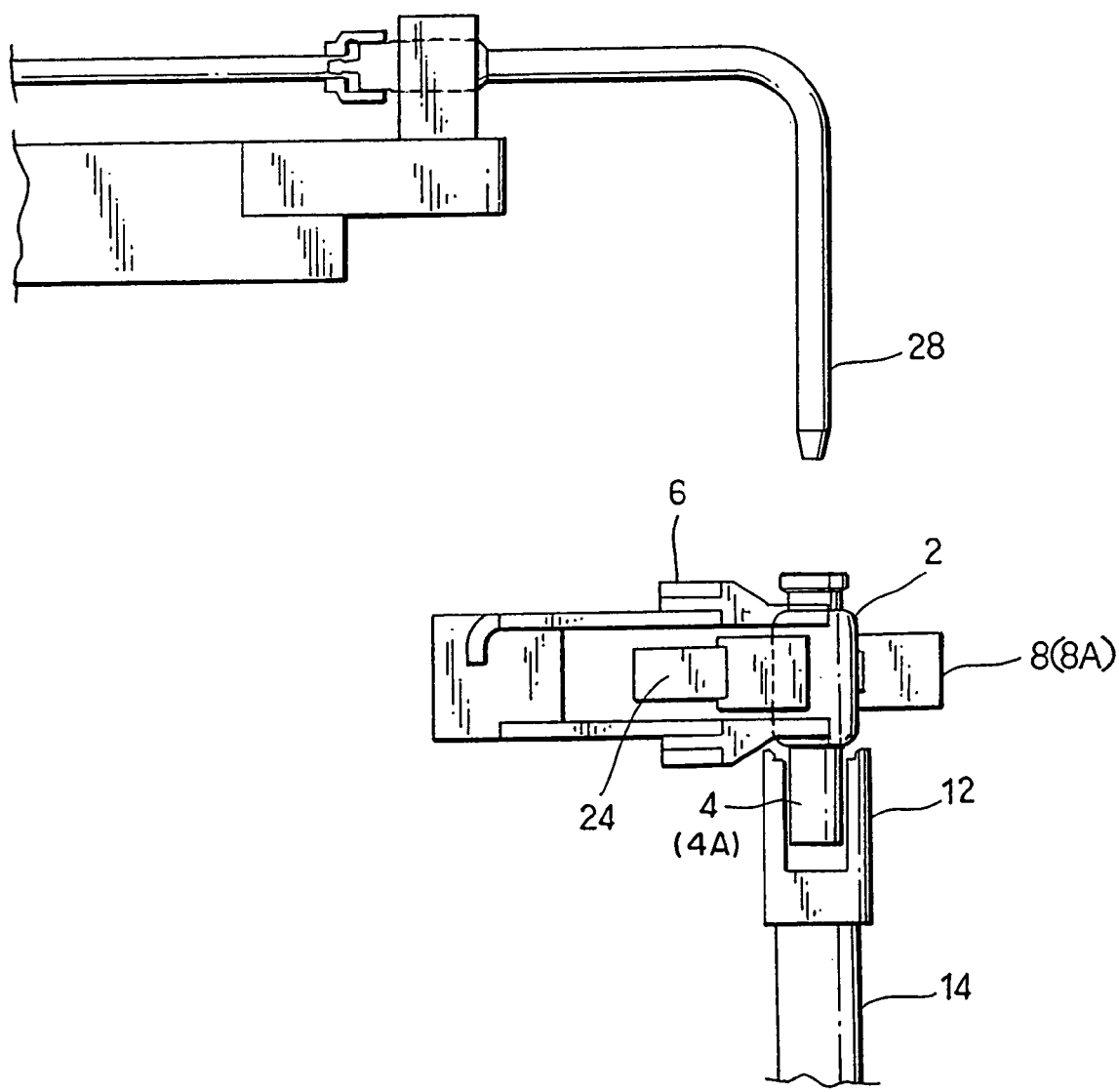
FIG. 4 is an illustration of a normal filling operation of the filler.
Figure 5:
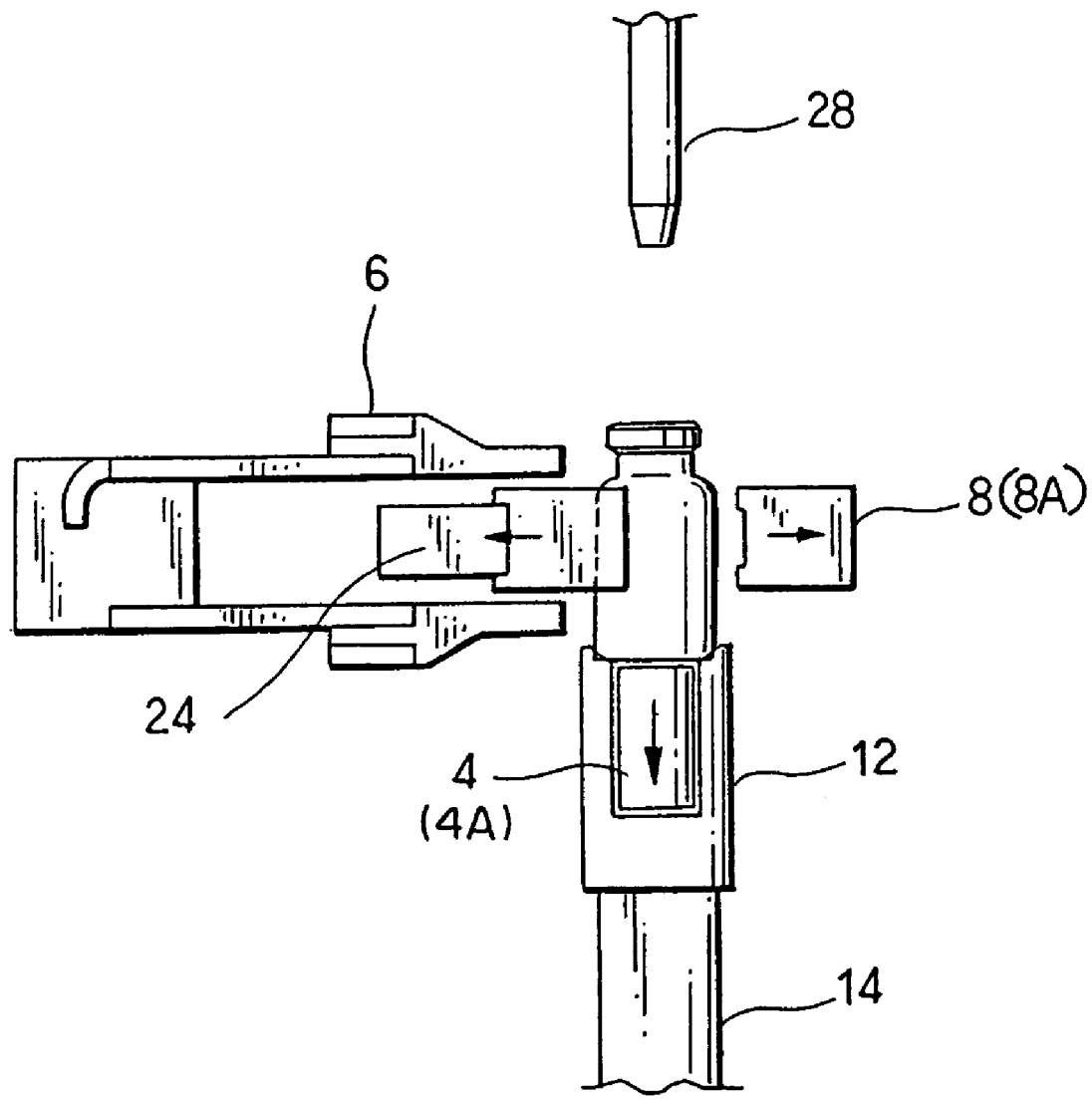
FIG. 5 is an illustration of a sampling operation of the filler.

Metering receptacles 12 are disposed below the elevatable conveying rail portion 4A which is provided at the filling station A in a manner corresponding to the filling position for each vessel 2. In this embodiment, eight vessels 2 are conveyed and filled concurrently, and accordingly, eight metering receptacles 12 are provided so as to correspond each of the vessels 2 (see FIG. 3). As shown in FIGS. 4 and 5, each of the metering receptacles 12 is channel-shaped in section, and has an opening which faces upward, and the elevatable conveying rail portion 4A is fitted into the channel-shaped recess of the metering receptacle 12 while avoiding a contact with the internal surface thereof.

Each metering receptacle 12 is connected through a load cell arm 14 to a load cell 16 located therebelow, allowing the weight of a vessel 2 which is placed on the metering receptacle 12 to be measured. As mentioned previously, the conveying rail portion 4A at the filling station F is elevatable, and when it is raised, the upper surface of the conveying rail portion 4A projects above the metering receptacle 12, as shown in FIG. 4, whereby the vessel 2 is supported by the conveying rail portion 4A and is clear from the metering receptacle 12. When the conveying rail portion 4A is lowered, the conveying rail portion is fitted into the channel-shaped recess of the metering receptacles 12 while avoiding a contact with the internal surface of the metering receptacle, whereby the vessel 2 is placed on the metering receptacle 12 as freed from the conveying rail portion 4A. A base 18 which supports the load cell 16 is disposed independently from a body 20 of the filler and thus is free from the influence of the body 20 of the filler.

A portion 8A of the back guide 8 which supports the barrels of the vessels 2 being conveyed from the back side and which is disposed within the filling station F is separated from its upstream portion 8B and its downstream portion 8C. Both the upstream portion 8B and the downstream portion 8C are fixedly mounted, but the portion 8A which is disposed within the filling station F is connected to a piston 22a of an air cylinder 22 which is disposed horizontally so as to be translatable back and forth in a direction perpendicular to the conveying line 1 for the vessels 2. Centering means (centering guide) 24 is disposed on the opposite of the vessels 2 from the translatable back guide 8A. The centering guide 24 is also connected to a piston rod 26a of an air cylinder 26 so as to be translatable back and forth in a direction perpendicular to the vessel conveying line 1. The front surface of the centering guide 24 is formed with V-shaped recesses 24a in the similar manner as the transfer rake 6.

Filling nozzles 28 are disposed above the filling station F in order to fill liquid into vessels 2 which stand still at the filling station F. In this embodiment, eight vessels 2 are conveyed and concurrently filled, and accordingly, eight filling nozzles 28 are disposed in a manner corresponding to the stationary positions of the respective vessels 2. The eight filling nozzles 28 are supported by the body 20 of the filler so as to be elevated in an integral manner. A liquid to be filled which is stored within a reservoir tank 30 is fed through a supplying pipe 34 to each filling nozzle 28 through a manifold 32, and a liquid valve 36 is disposed in the supplying pipe 34 which feeds the filled liquid to each filling nozzle 28. A filling operation takes place by opening/closing the liquid valve 36 to open or close a liquid passage through the supply pipe 34.

A timer-controlled filling operation is employed in this embodiment, and a filling of a given quantity takes place by controlling an opening/closing of the liquid valve 36 by means of a controller 38. Pressurizing means 40 is connected to the reservoir tank 30 to apply a given pressure to the interior of the reservoir tank 30. The pressure of a filled liquid which is fed from the reservoir tank 30 to the filling nozzle 28 is detected by a pressure sensor 42 disposed in the manifold 32, and a detection signal is input to the controller 38. The controller has a predetermined pressure-time function in storage, and calculates a filling time in accordance with a detection signal from the pressure sensor 42 and controls an opening/closing of the liquid valve 36 in accordance with a time interval which is counted by a timer. In this embodiment, a timer-controlled filling operation in which a pressure is detected by the pressure sensor 42 disposed in the path of the filled liquid and the liquid valve 36 is controlled in accordance with a predetermined pressure-time function is equivalent to mensuration means as called for in the claims. It should be noted that the filling operation is not limited to time-controlled filling operation as used in this embodiment, but may also comprise a flow rate controlled filling operation in which a flow meter is used to control the liquid valve while determining flow rate of the filled liquid or may comprise a cylinder-piston controlled filling operation in which the filling operation takes place while determining a given quantity of filled liquid fed into a cylinder while moving a piston or any other filling operation may also be used. A flow meter for the flow rate controlled filling operation or a cylinder-piston combination for the cylinder-piston controlled filling operation is equivalent to mensuration means mentioned above.

The operation of the filler constructed in the manner mentioned above will now be described. A number of vessels 2 which are placed in one row on the conveying rail 4 are held sandwiched between the transfer rake 6 and the back guide 8 as the transfer rake 6 advances from its retracted position (position spaced from the conveying rail 4) toward the back guide, and are carried forward through a distance corresponding to eight vessels 2 as the transfer rake 6 moves in a downstream direction (or to the left as viewed in FIG. 2). The vessels 2 which are successively conveyed by the transfer rake 6 are carried into the filling station F in unit of eight vessels.

Figure 1:
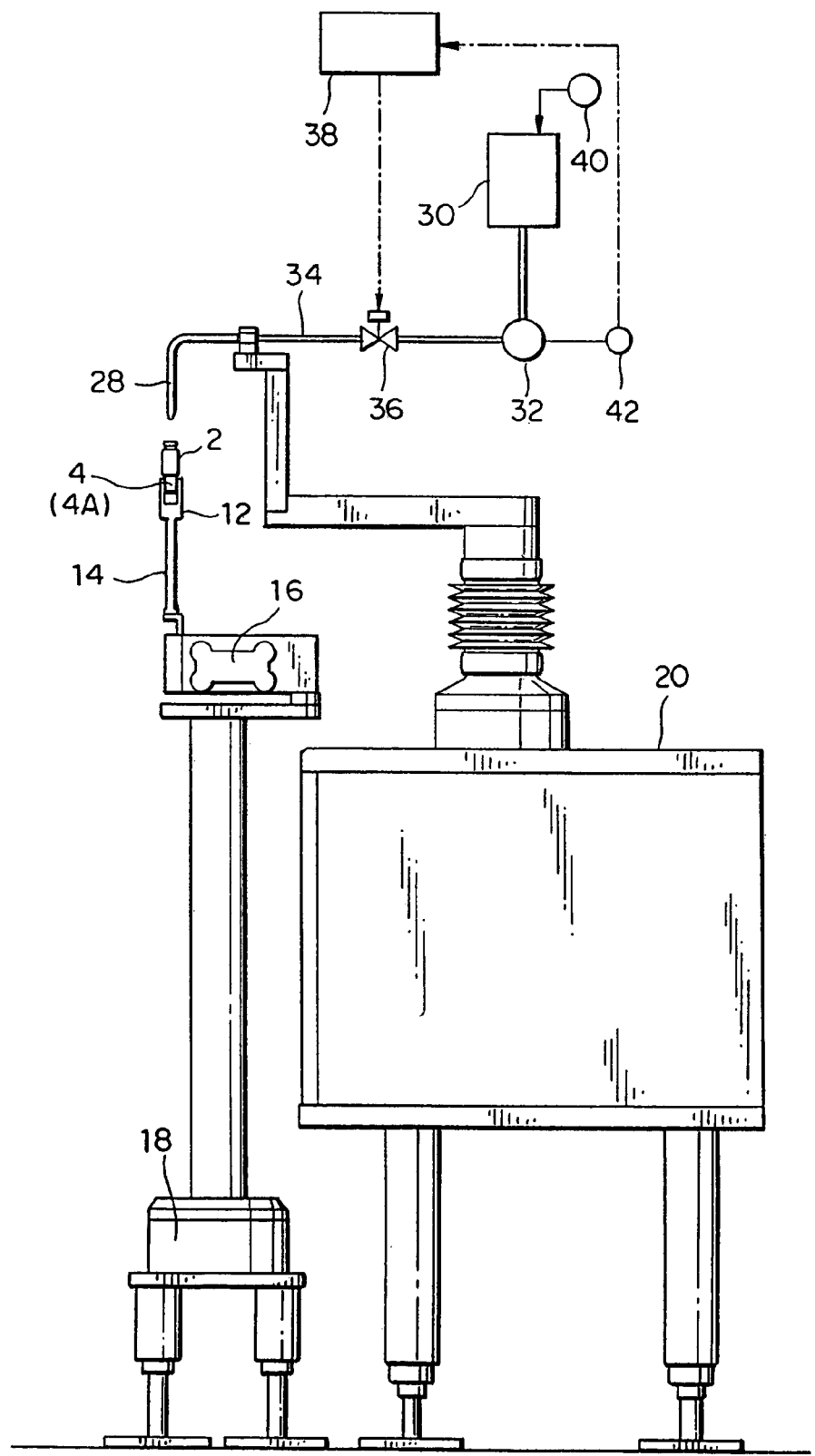
FIG. 1 is a schematic illustration of an overall arrangement of a filler according to one embodiment of the present invention.

The movable back guide 8(8A) and the centering guide 24 are disposed opposite to each other in the filling station F. At a point in time when the vessels 2 are carried into the filling station F, the movable back guide 8A has advanced to abut against the vessels 2 while the centering guide 24 which is oppositely located remains retracted at a position where it does not engage the vessels 2. However, when the vessels 2 are carried into the filling station F by the operation of the transfer rake 6, the centering guide 24 is then advanced to hold the vessels 2 sandwiched between it and the back guide 8A (see FIGS. 1 and 4).

The filler has eight filling nozzles 28 so as to correspond to eight vessels 2 which are carried into the filling station F, and when the vessels 2 come to a stop, the filling nozzles 28 are lowered until their tip ends are inserted into the respective vessels 2. After the filling nozzles 28 have been inserted into the vessels 2, the liquid valve 36 is opened to initiate a filling operation. As mentioned previously, a timer-controlled filling operation takes place in this embodiment. Specifically, the controller 38 which controls an opening/closing of the liquid valve 36 has a predetermined pressure-time function in storage, and calculates a filling time in response to a signal from the pressure sensor 42 which is disposed within the manifold 32, thus controlling an opening/closing of the liquid valve 36.

When a filling operation takes place for a time interval which is controlled by the controller 38, the liquid valve 36 is closed to terminate the filling operation. Upon termination of the filling operation, the air cylinder 26 is actuated to retract the centering guide, and the transfer rake is operated to displace the vessels 2 in a downward direction from the filling station F. During this normal operation, the elevatable conveying rail portion 4A provided in the filling station F assumes its raised position which is at the same elevation as the upstream and the downstream portion of the conveying rail 4, thus supporting the bottom surfaces of the vessels 2. Accordingly, during a normal filling operation, the vessels 2 in the filling station F do not contact the metering receptacles 12, and hence, a metering operation by the load cell 16 does not take place.

A sampling operation then takes place in order to confirm whether or not the quantity of liquid filled by a control of the opening/closing of liquid valve 36 by the controller 38 is correct. The sampling operation takes place at an interval of 15 minutes or 30 minutes, for example, or at any desired interval required. When a sampling signal is input, at the time the transfer rake 6 has carried the vessels 2 into the filling station F, the air cylinders 26 and 22 cause the centering guide 24 and back guide 8A to retract, thus clearing the vessels 2 from the guides 24 and 8A. It is preferred that the running speed be slowed down during the sampling operation than during the filling operation.

The elevatable conveying rail portion 4A is then lowered to place the vessels 2 on the metering receptacles 12 (see FIG. 5). Initially, the tare of the vessel 2 is determined. The purpose of measuring the tare is not to detect the weight of the tare, but to reset the load cell 16 to zero in a stable manner. After the load cell 16 is reset to zero, the liquid valve 36 is opened to initiate a filling operation while measuring the filled weight by the load cell 16. In the present embodiment, a timer controlled filling operation takes place, and after a given time interval has passed, the liquid valve 36 is closed and the filling operation is terminated. A result of a measurement by the load cell 16 is fed to the controller 38. If the filled weight goes outside a given range, a signal is transmitted to a rejector (not shown) which is disposed downstream. One of the vessels 2 for which the signal has been generated is rejected from the conveying line 1 when it reaches the rejector. When the sampling is terminated, the conveying rail portion is raised, and the back guide 8A is advanced, conveying the vessels 2 downstream.

As mentioned above, in the filler according to the embodiment, a sampling operation is enabled by merely lowering the conveying rail portion 4A temporarily to permit a mensuration by the load cell 16 for purpose of a filling operation, and accordingly, there is no need for the provision of additional mechanism to perform a sampling operation. The construction is simple, the cost is reduced and there is no need for providing a space for sampling purpose. The sampling operation can take place for a number of vessels equal to the number of the filling nozzles 28 simultaneously, in a similar manner as the normal filling operation takes place in the filling station F, allowing a length of time required for the sampling operation to be substantially reduced.

What is claimed is:

1. A filler including conveying means for intermittently conveying vessels placed on a conveying rail by engaging the vessels, filling means disposed on a path of conveying the vessels for filling a liquid into the vessel, mensuration means for determining a quantity filled by the filling means, and control means for controlling an opening/closing of a liquid valve in the filling means, whereby a given quantity of liquid is filled into the vessel while the filled quantity is determined by the mensuration means; further comprising
    elevating means for elevating the conveying rail;
    moving means for moving the conveying means to a position where it engages a vessel and another position where it does not engage a vessel;
    a metering receptacle disposed in a manner corresponding to the position of the filling means to place a vessel thereon when the conveying rail is lowered and positioned at an elevation where it does not contact a vessel when the conveying rail is raised;
    and weight detecting means connected to the metering receptacle;
    the conveying rail being raised to support a vessel when a normal filling operation takes place, and the conveying rail being lowered to place a vessel on the metering receptacle when a sampling operation takes place, the mensuration means being effective to detect the weight of the liquid filled into the vessel by the weight detecting means.

2. The filler according to claim 1 characterized in that a guide which support barrels of vessels which are conveyed by the conveying means is provided.

3. The filler according to claim 2 in which the guide includes a portion which is disposed where a filling operation takes place by the filling means and which is translatable, the portion of the guide being retracted away from the vessel during a sampling operation.

4. The filler according to claim 3 characterized in that centering means is disposed opposite to the translatable portion of the guide, the centering means being advanced to hold a vessel sandwiched between it and the translatable portion of the guide during a filling operation, and being retracted away from the vessel during a sampling operation.

5. The filler according to claim 1 characterized in that the mensuration means comprises a pressure sensor for detecting a pressure of the filled liquid, and a timer for counting a filling time interval, an opening/closing of the liquid valve being controlled in accordance with a pressure-time function which is previously stored in a controller.

* * * * *